United States Patent [19]

Komaki et al.

[11] Patent Number: 5,185,730
[45] Date of Patent: Feb. 9, 1993

[54] METHOD FOR READING DATA FROM OPTICAL DISK

[75] Inventors: Toshihiro Komaki; Hideo Kudo; Tomonori Ishizuki; Shinichi Yokozeki, all of Saitama, Japan

[73] Assignee: Pioneer Electronic Corporation, Tokyo, Japan

[21] Appl. No.: 527,908

[22] Filed: May 24, 1990

[30] Foreign Application Priority Data

Jun. 1, 1989 [JP] Japan ................................ 1-139433
Apr. 11, 1990 [JP] Japan ................................ 2-95547

[51] Int. Cl.⁵ .............................................. G11B 7/00
[52] U.S. Cl. ................................ 369/44.26; 369/44.28; 369/32
[58] Field of Search ............... 369/44.26, 44.11, 32, 369/44.13, 44.38, 44.39, 111, 124, 44.27, 44.28, 44.29, 44.31; 358/907

[56] References Cited

U.S. PATENT DOCUMENTS

| 4,494,154 | 1/1985 | Akiyama ............................. 369/32 |
| 4,561,082 | 12/1985 | Gérard et al. ..................... 369/44.13 |
| 4,779,251 | 10/1988 | Burroughs ......................... 369/44.26 |
| 4,932,013 | 6/1990 | Kojima et al. ........................ 369/32 |
| 4,952,787 | 8/1990 | Nakamura et al. ............... 369/44.11 |
| 4,972,350 | 11/1990 | Sander et al. ........................ 369/32 |
| 5,001,695 | 3/1991 | Tominaga ......................... 369/44.26 |
| 5,073,880 | 12/1991 | Maeda et al. ..................... 369/44.26 |

FOREIGN PATENT DOCUMENTS

| 3821811 | 1/1989 | Fed. Rep. of Germany ... 369/44.11 |
| 59-139147 | 8/1984 | Japan ............................... 369/44.11 |
| 60-151880 | 8/1985 | Japan ...................................... 369/32 |
| 63-148419 | 6/1988 | Japan ............................... 369/44.11 |
| 1-35726 | 2/1989 | Japan ............................... 369/44.11 |
| 2151355 | 6/1985 | United Kingdom ............. 369/44.11 |

Primary Examiner—Jeffery A. Brier
Assistant Examiner—Thai Tran
Attorney, Agent, or Firm—Sughrue, Mion, Zinn, Macpeak & Seas

[57] ABSTRACT

A method for writing data to and reading data from an optical disk that has address information written on its land between grooves or in its pregrooves. Because data is written to and read from the pregrooves or land where no address is written, continuous signals can be written to and read from the disk without format change. Further, the data area is widened by the amount of the nonexistent address area.

10 Claims, 2 Drawing Sheets

METHOD FOR READING DATA FROM OPTICAL DISK

BACKGROUND OF THE INVENTION

1. Field of the Invention

The present invention relates to a method for reading data from the optical disk and, more particularly, to a method of reading data from such optical disks as DRAW (write once type) and EDRAW (erasable rewritable type) disks as well as magneto-optical disks and phase change optical disks.

2. Description of the Prior Art

Optical disks of the kinds mentioned above have on their surface pregrooves 21 that guide the beam spot for writing and reading data, as shown in FIG. 3. A land 22 between pregrooves 21 contains beforehand a pre-format pattern (called an address area) as fixed information.

With such optical disks, data is written to the data area having gaps and not to the address area thereof. This means that while there is no need for format conversion when the disk is used for data files, it is necessary to convert the signal format thereof if the disk is used as a CD (compact disk) editor.

SUMMARY OF THE INVENTION

It is therefore an object of the present invention to provide a method for reading data from the optical disk, the method being applied to write and read continuous signals such as the CD format signal to and from the optical disk while enlarging the data area in which to write data.

The data writing and reading method (also referred to as accessing the disk) according to the invention applies to optical disks having pregrooves that guide the beam spot, the pregrooves flanking a land (or pregrooves) that contains address information beforehand. The method involves generating a control signal for controlling the polarity and level of the direction and amount of deviation of the beam spot directed at the land (or pregrooves). In accordance with the control signal, the beam spot is made to follow the land (or pregrooves) while reading address information therefrom. This allows the beam spot to gain access to an appropriate address location. Then the control signal is inverted in polarity to provide an inverted control signal. Based on the inverted control signal, the beam spot is made to follow the pregrooves (or land) as it writes (or reads) necessary data.

DETAILED DESCRIPTION OF A PREFERRED EMBODIMENT

Figure 1:
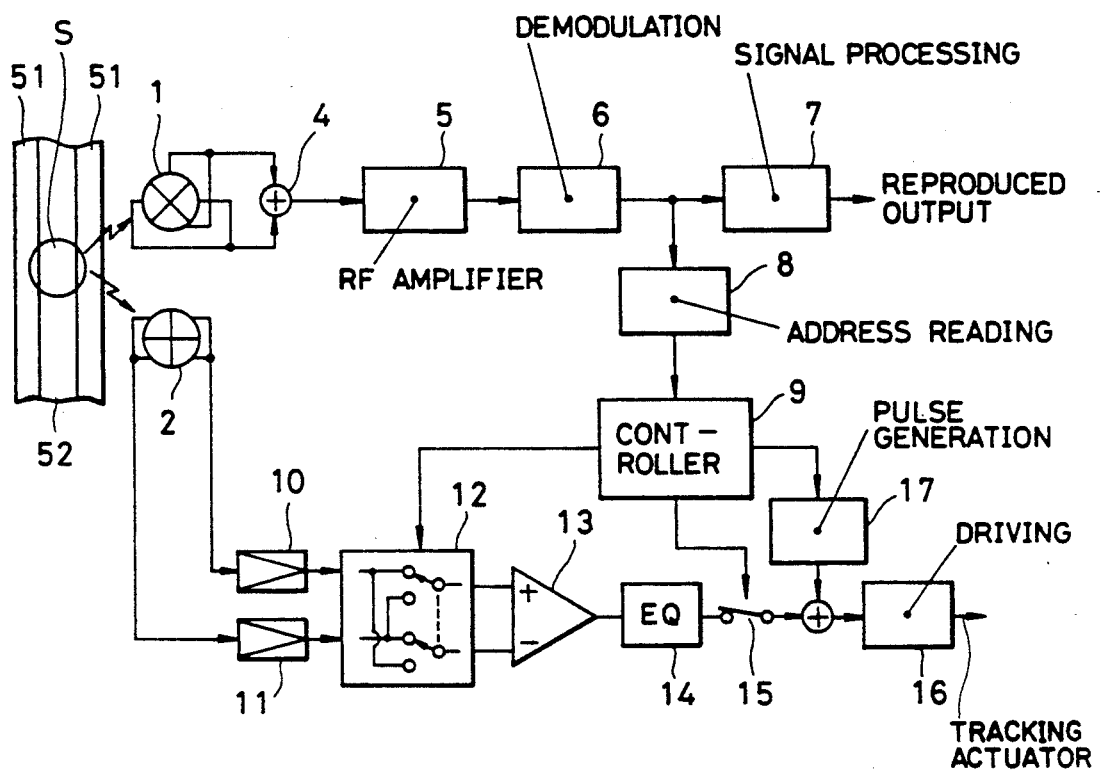
FIG. 1 is a block diagram of a disk drive relating to the present invention.
Figure 2:
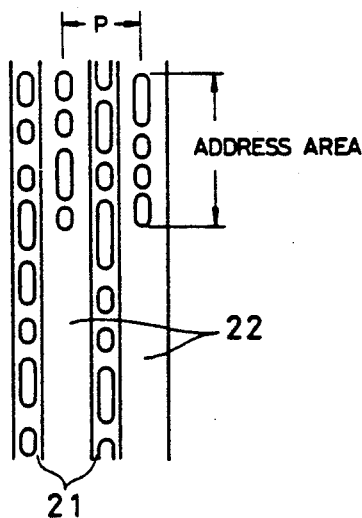
FIG. 2 is an enlarged plan of how data is written to an optical disk surface by use of the method according to the invention.
Figure 3:
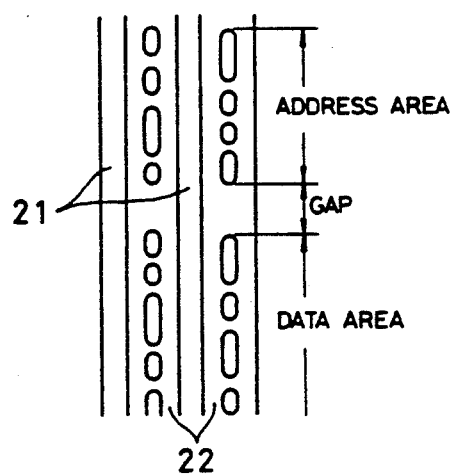
FIG. 3 is an enlarged plan of how data is written conventionally to an optical disk surface.

A preferred embodiment of the present invention will now be described in detail by referring to the accompanying drawings. In FIG. 1, a beam spot S, obtained by converging a laser beam, is emitted from an optical head, not shown, to a track 22 (or pregroove track 21) on an optical disk. The beam spot S causes a reflected light beam to come from the disk surface and to enter photoelectric conversion devices 1 and 2 built in the optical head. There, the reflected light beam is converted to an electric signal. The optical head has an optical system containing an object lens, a focus actuator that controls the object lens in its optical axis with respect to the disk surface, and a tracking actuator that controls the beam spot S in its disk radius direction with respect to the land 22 (or pregroove track 21). The optical head is mounted on a carriage, not shown, which moves freely in the disk radius direction.

The photoelectric conversion device 1 illustratively comprises four light-receiving elements which divide the light-receiving surface into four and which are independent of one another. These elements are positioned opposite to one another around the center of the light-receiving surface. The sum of the outputs from one pair of the opposed elements and the sum of the outputs from the other pair of the likewise opposed elements are supplied to an adder 4. The adder 4 provides the grand total of the outputs, the total being represented by a total sum signal which is used as a read RF signal. A focus error signal is obtained by computing the difference in the sum of outputs between the two pairs of the opposed elements. The read RF signal is fed to a demodulation circuit 6 via an RF amplifier 5. A demodulated output from the demodulation circuit 6 is suitably processed by a signal processing circuit 7 to become a reproduced output. At the same time, the demodulated output is also supplied to an address reading circuit 8 that reads address information therefrom. The address information acquired by the address reading circuit 8 is given to a controller 9.

Meanwhile, the output from one pair of the opposed elements in the photoelectric conversion device 2 is amplified by amplifiers 10 and 11 before being supplied to a differential amplifier 13 via a signal switching circuit 12. This arrangement permits acquisition of a signal representing the difference between the two pairs of the elements in the device 2. The difference signal is used as a tracking error signal. The signal switching circuit 12 forwards the output of the amplifier 10 to either an uninverted input terminal or an inverted input terminal of the differential amplifier 13, and supplies the output of the amplifier 11 to either the inverted input terminal or the uninverted output terminal thereof. This switching action inverts the tracking error signal in polarity. The switching operation of the signal switching circuit 12 is controlled by the controller 9. With its frequency and phase characteristics compensated by an equalizer (EQ) circuit 15, the difference signal of the differential amplifier 13, i.e., the tracking error signal, is used to drive a tracking actuator, not shown, through a loop switch 15 and a driving circuit 16.

In the manner described, a tracking servo loop is formed. When the loop switch 15 is on (closed), the loop is closed. In the closed loop state, the tracking actuator is driven in accordance with the polarity and level of the tracking error signal. This allows the beam spot S to follow accurately the land or pregrooves.

The controller 9 illustratively comprises a microcomputer, the processor thereof providing control over switching the signal switching circuit 12, turning on and off the loop switch 15, and driving a kick pulse generation circuit 17. The kick pulse generation circuit 17 generates kick pulses of which the pulse width and peak values cause the beam spot S to move by half of the land pitch "p" (p/2) in the disk radius direction. The kick pulses are applied to the tracking actuator via the driving circuit 16, causing the beam spot S to move from land to pregrooves or vice versa.

The recording section, whose construction is omitted in FIG. 1, may be of a known construction comprising an optical modulator that turns on and off the laser beam depending on the data to be written.

Figure 4:
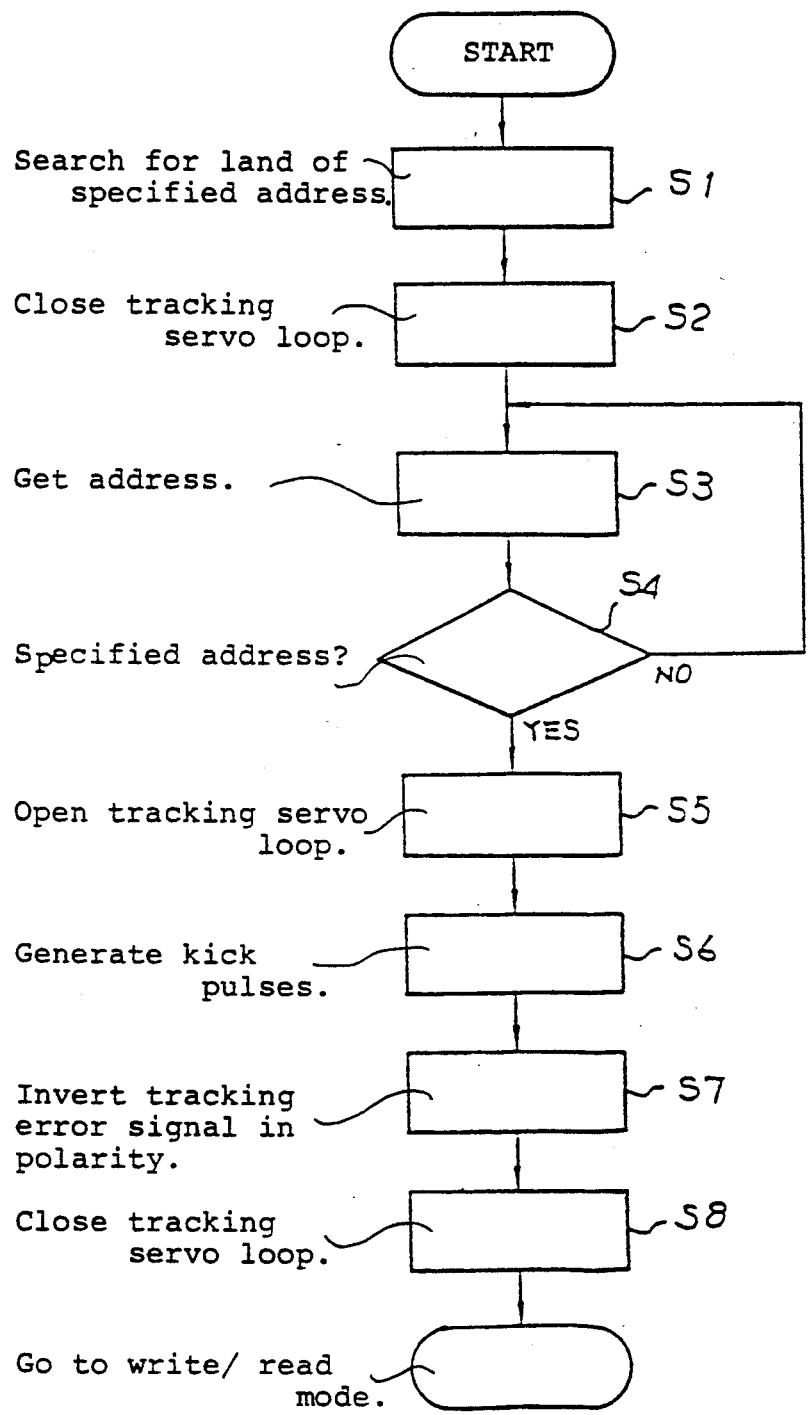
FIG. 4 is a flowchart showing how the method according to the invention provides steps to read data from an optical disk surface.

Referring now to the flowchart of FIG. 4, there will now be described the steps to read data from the optical disk under control of the processor of the controller 9. This embodiment involves optical disks having address information written on the land thereof. It will be appreciated that the invention is also applicable to optical disks that have address information written in their pregrooves.

In step S1, using a known search method, the processor searches for the land where the specified address is written. In step S2, with the target land reached, the tracking servo is withdrawn and the loop thereof is closed. This causes the beam spot S to follow the land. In step S3, the processor gets the address information that was read by the address reading circuit 8. In step S4, a check is made to see if the acquired address is the specified address. This process is repeated until the target address is successfully accessed by the beam spot S.

With the specified address reached, the tracking servo loop is opened in step S5. In step S6, the processor drives the kick pulse generation circuit 17 to generate kick pulses. This causes the beam spot S to move from the land to the adjacent pregroove determined by the polarity of the kick pulses. In step S7, the signal switching circuit 12 is activated to invert the tracking error signal in polarity. In step S8, the tracking servo is withdrawn and the loop thereof is closed. This causes the beam spot S to follow the pregrooves. In this state, the processor enters the data write (or read) mode.

On the optical disk having address information written on the land track 22 (or in pregroove track 21), data is written (or read) to the pregrooves 21 (or from land) in the manner described above. Because data is written to the pregrooves 21 (or land 22) where no address information is written, recorded signals are not interrupted due to the presence of the address area. Thus the CD format signal and other continuous signals can be written uninterrupted, i.e., with no change in the recording format. Since no address area exists in the pregroove track 21 (or on land track 22) where data is to be written, the data area is increased by the amount of the nonexistent address area.

If data is written in the CD format, a meaningful series of data is always ended with data "AA" representing a track number of the end area; if data is written as a general-purpose data file, that file is ended with a label "EOF" (end of file). Therefore the data is accessed by detecting the track number "AA" or the label "EOF" which indicates the end of the series thereof. Upon detection of the number or label, or at the end of writing the data, the beam spot S is returned to the land 22 (or pregrooves 21) to read the next address information in the time base direction. For example, where a plurality of addresses are specified, the next target address is searched for based on the current address acquired by repeating the procedure depicted in FIG. 4.

When the target address is read, the beam spot S is relocated to the pregrooves 21 (or land 22). Thus begins another cycle of read or write operations.

Where data is written, the pit length of the data area is set relative to that of the address area so that the basic frequency component in the frequency signal from the address area may differ from the basic frequency component in the frequency signal from the data area. This setting prevents cross talk from developing between pregroove and land.

As indicated, the method according to the present invention for reading data from the optical disk involves writing data to or reading data from pregrooves (or land) of an optical disk that has address information written beforehand on its land between pregrooves (or in pregrooves themselves). This method allows the CD format signal and other continuous signals to be written and read without format change. Furthermore, the data area on the optical disk is increased by the amount of the nonexistent address area.

What is claimed is:

1. A method for controlling a position of an optical head relative to an optical disk, said disk containing first and second sets of tracks, wherein one of said first and second sets of tracks is composed of pregroove tracks and the other of said first and second sets of tracks is composed of land tracks, said pregroove tracks and land tracks being alternately distributed on said disk, said disk having prerecorded address information stored only on said first set of tracks, said method comprising the steps of:

generating a control signal for controlling tracking of a beam spot on said optical head while said optical head accesses said disk, wherein said optical head accesses said first set of tracks when said control signal has a first polarity and accesses said second set of tracks when said control signal has a second polarity, setting said control signal to said first polarity in order for said optical head to access said first set of tracks containing said prerecorded address information, alternately reading and moving said beam spot between tracks in said first set of tracks, comparing prerecorded address information read from tracks in said first set with a desired address, switching said control signal from said first polarity to said second polarity, when said desired address and address information read from a track in said first set match, in order for said beam spot to access a desired track in said second set that corresponds to said desired address.

2. A method for controlling a position of an optical pickup as claimed in claim 1, further comprising the steps of:

reading data from said desired track in said second set of tracks, switching said control signal from said second polarity to said first polarity, after reading said data, in order for said beam spot to access said first set of tracks containing prerecorded address information.

3. A method for controlling a position of an optical pickup as claimed in claim 1, further comprising the steps of:

generating a kick pulse to move said beam spot from a track in said first set of tracks, that corresponds to said desired address information, to an adjacent corresponding track in said second set of tracks, after switching said control signal from said first polarity to said second polarity.

4. A method for controlling a position of an optical pickup as claimed in claim 2, further comprising the steps of:

generating a kick pulse to move said beam spot from a desired track in said second set of tracks, that corresponds to said desired address information, to a track in said first set of tracks, after switching said control signal from a second polarity to said first polarity.

5. A method for controlling a position of an optical pickup as claimed in claim 1, wherein said first set of tracks only contain address information and said second set of tracks only contain data.

6. An apparatus for controlling a position of an optical head relative to an optical disk, said disk containing first and second sets of tracks, wherein one of said first and second sets of tracks is composed of pregroove tracks and the other of said first and second sets of tracks is composed of land tracks, said pregroove tracks and land tracks being alternately distributed on said disk, said disk having prerecorded address information stored only on said first set of tracks, said apparatus comprising:

means for generating a control signal for controlling tracking of a beam spot on said optical head while said optical head accesses said disk, wherein said optical head accesses said first set of tracks when said control signal has a first polarity and accesses said second set of tracks when said control signal has a second polarity, means for setting said control signal to said first polarity in order for said optical head to access said first set of tracks containing said prerecorded address information, means for alternately reading and moving said beam spot between tracks in said frist set of tracks, means for comparing prerecorded address information read from tracks in said first set with a desired address, means for switching said control signal from said first polarity to said second polarity, when said desired address and address information read from a track in said first set match, in order for said beam spot to access a desired track in said second set that corresponds to said desired address.

7. An apparatus for controlling a position of an optical pickup as claimed in claim 6, further comprising:

means for reading data from said desired track in said second set of tracks, means for switching said control signal from said second polarity to said first polarity, after reading said data, in order for said beam spot to access said first set of tracks containing prerecorded address information.

8. An apparatus for controlling a position of an optical pickup as claimed in claim 6, further comprising:

means for generating a kick pulse to move said beam spot from a track in said first set of tracks, that corresponds to said desired address information, to an adjacent corresponding track in said second set of tracks, after switching said control signal from said first polarity to said second polarity.

9. An apparatus for controlling a position of an optical pickup as claimed in claim 7, further comprising:

means for generating a kick pulse to move said beam spot from a desired track in said second set of tracks, that corresponds to said desired address information, to a track in said first set of tracks, after switching said control signal from a second polarity to said first polarity.

10. An apparatus for controlling a position of an optical pickup as claimed in claim 6, wherein said first set of tracks only contain address information and said second set of tracks only contain data.

* * * * *